United States Patent [19]

Stone et al.

[11] Patent Number: 4,465,299
[45] Date of Patent: Aug. 14, 1984

[54] VEHICLE SUSPENSION WITH LOAD-CONTROLLED DAMPING AND LOAD-CONTROLLED DAMPER

[75] Inventors: Thomas R. Stone, Hayward; Roger P. Penzotti, Livermore, both of Calif.

[73] Assignee: Paccar Inc., Bellevue, Wash.

[21] Appl. No.: 445,724

[22] Filed: Nov. 30, 1982

[51] Int. Cl.³ .............................................. B60G 17/00
[52] U.S. Cl. .................................. 280/714; 188/283; 188/299; 267/64.15; 280/709
[58] Field of Search ............... 280/683, 702, 709, 710, 280/6 R; 267/64.15; 188/283, 299, 313, 266

[56] References Cited

U.S. PATENT DOCUMENTS

| | | | |
|---|---|---|---|
| 1,259,892 | 3/1918 | Marx | 188/283 |
| 1,319,086 | 10/1919 | Jacques | 188/283 |
| 1,522,243 | 1/1925 | Hughes | 188/313 |
| 1,945,036 | 1/1934 | Green | 188/283 |
| 1,967,833 | 7/1934 | Livermore et al. | 188/283 |
| 2,825,578 | 3/1958 | Walker | 280/715 |
| 2,825,580 | 3/1958 | Walker | 280/688 |
| 2,840,390 | 6/1958 | Walker | 280/688 |
| 2,856,199 | 10/1958 | Walker | 280/712 |
| 3,001,782 | 9/1961 | Gaebler | 267/11 |
| 3,790,146 | 2/1974 | Hoffmann et al. | 280/709 |
| 3,873,122 | 3/1975 | Fischer | 280/710 |
| 4,054,277 | 10/1977 | Sirven | 267/64.15 |
| 4,084,667 | 4/1978 | Kurrat | 280/714 |
| 4,154,461 | 5/1979 | Schnittger | 280/714 |
| 4,273,303 | 6/1981 | Somm | 188/299 |

Primary Examiner—Joseph F. Peters, Jr.
Assistant Examiner—Kenneth R. Rice
Attorney, Agent, or Firm—Owen, Wickersham & Erickson

[57] ABSTRACT

A vehicle suspension system with load-controlled damping for a vehicle having a leveling valve actuated by changes in the distance between the axles and the frame and connected to air springs and to a damper to provide load control of the damper. The damper has two cylinders, an inner one filled with oil and in which a piston moves, and an outer one with an annular space between them mostly filled with oil. A jounce metering valve passes oil from below the piston into the annular space upon downward movement of the piston, the resistance to the fluid flow being varied by pressure applied by the leveling valve in accordance with vehicle load. A high-speed-jounce blow-off valve passes oil in the same manner in larger amount when actuated by high-velocity downward movement of the piston, the actuation speed depending on the pressure applied by the leveling valve. Similarly a rebound metering valve sends oil through the piston upon its upward movement, and there is a high-speed-rebound blow-off valve for sending additional oil therethrough, and the resistance of the pressure and the actuation velocity of the latter depend on the pressure applied by the leveling valve, which depends on the frame-supported load.

51 Claims, 16 Drawing Figures

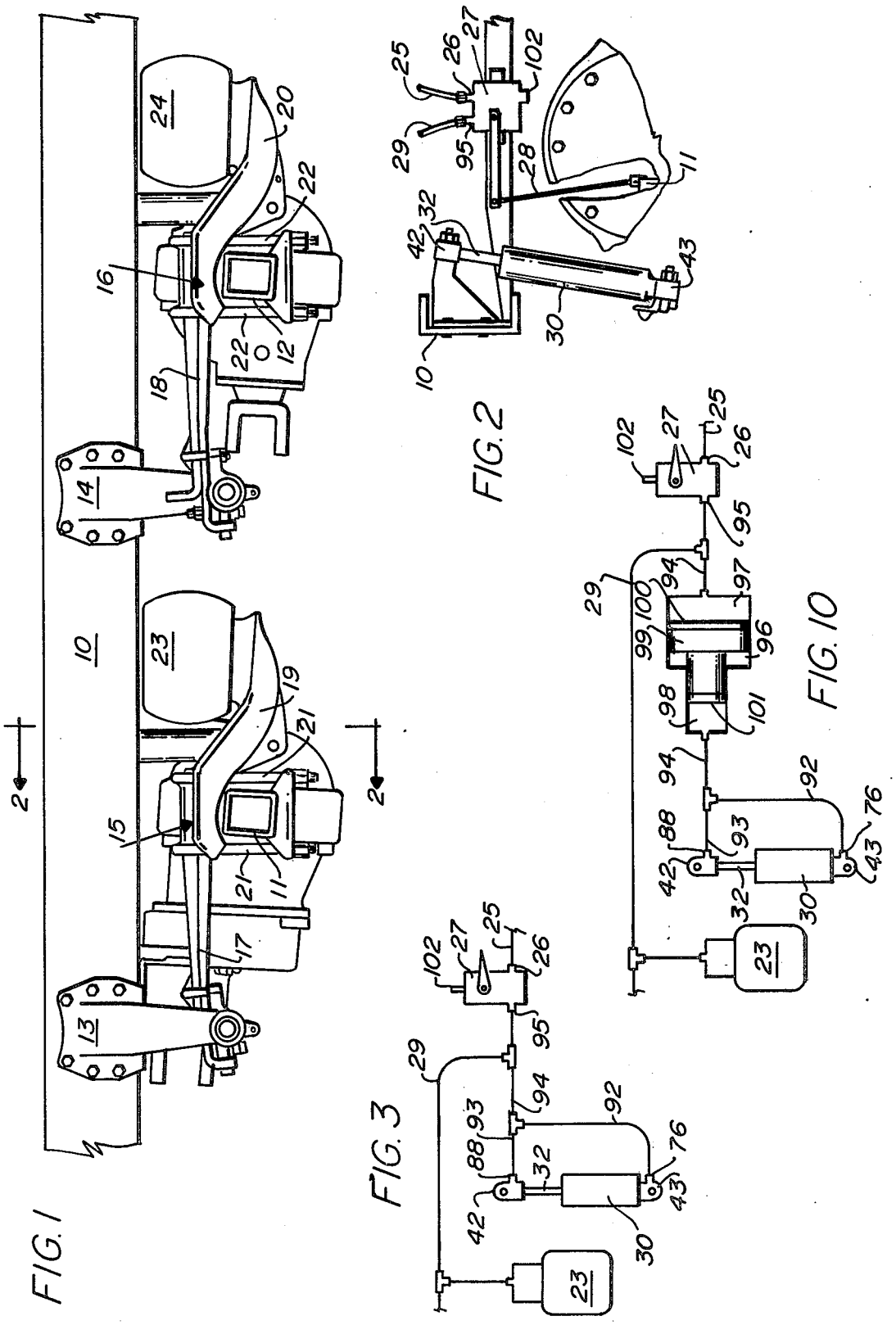

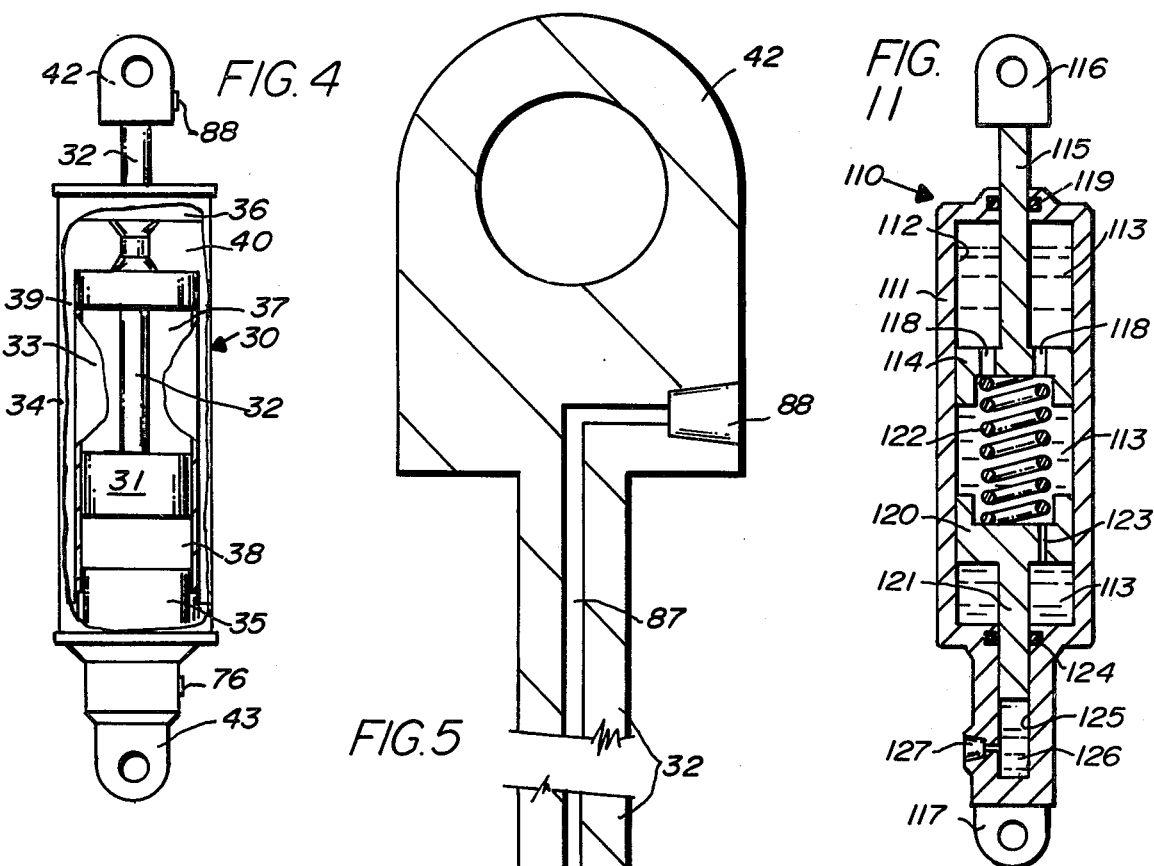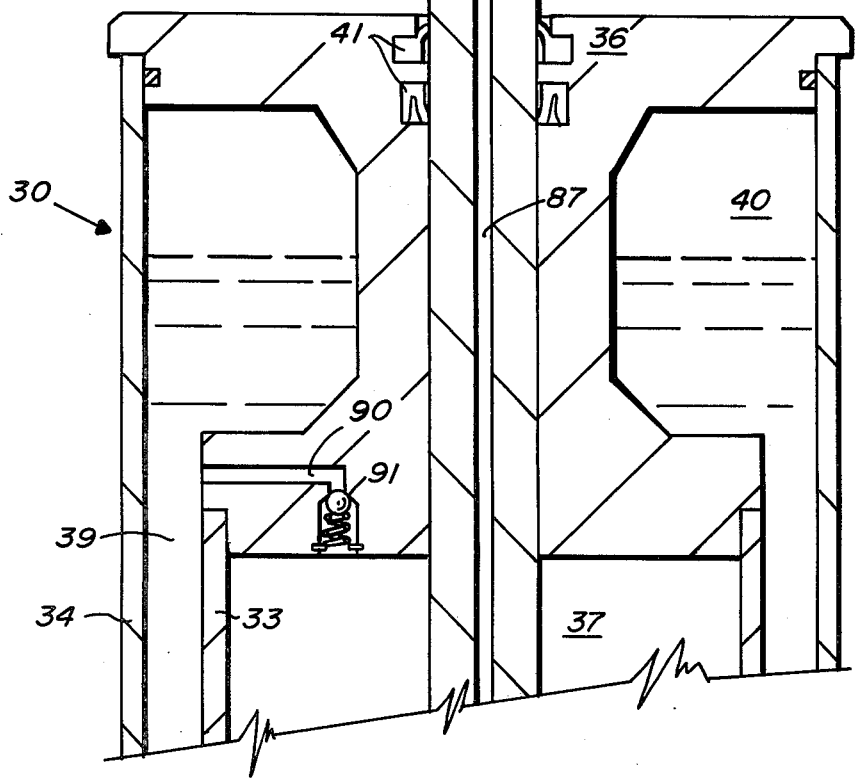

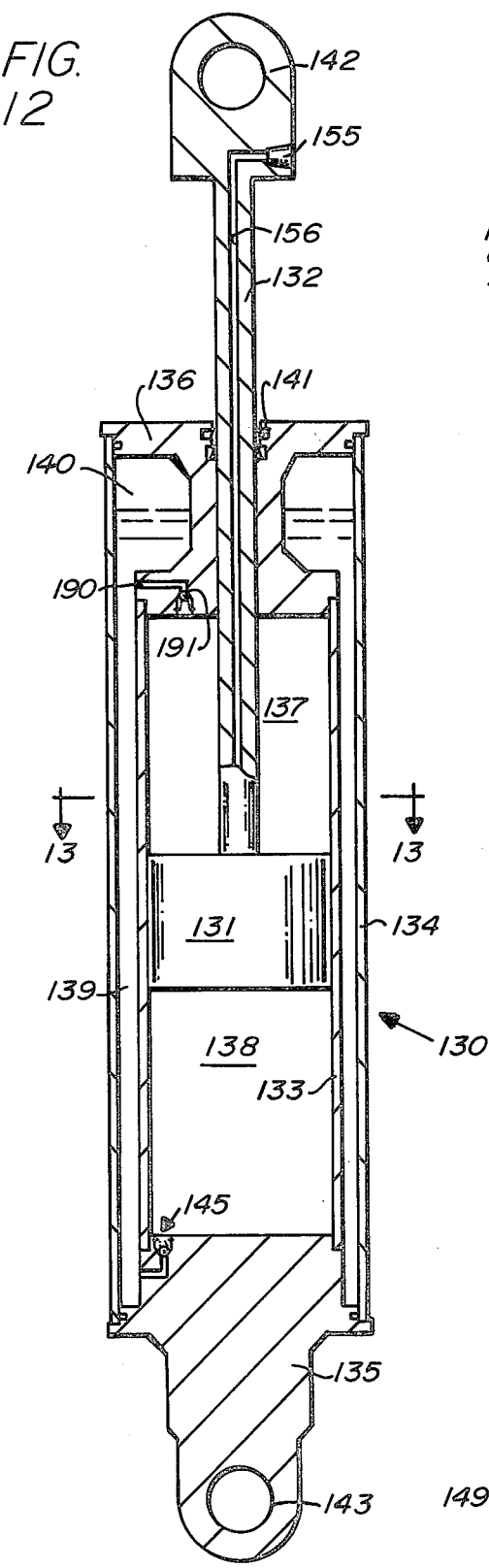
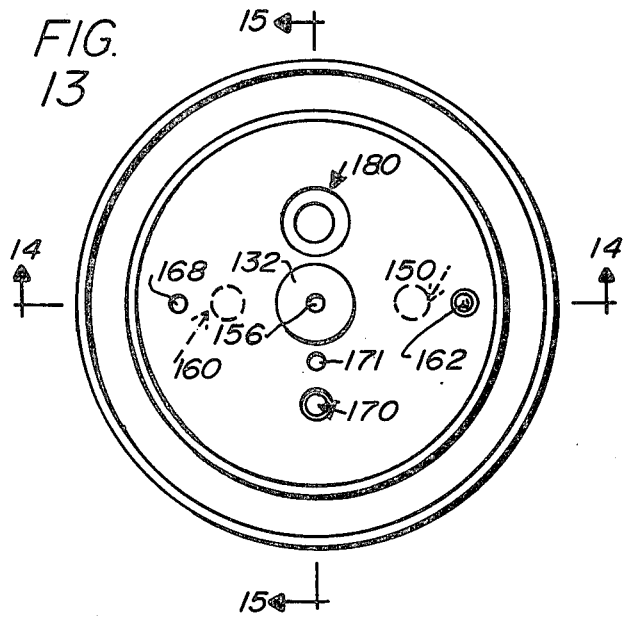
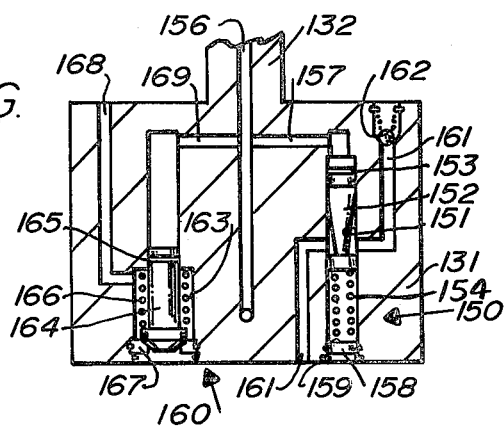
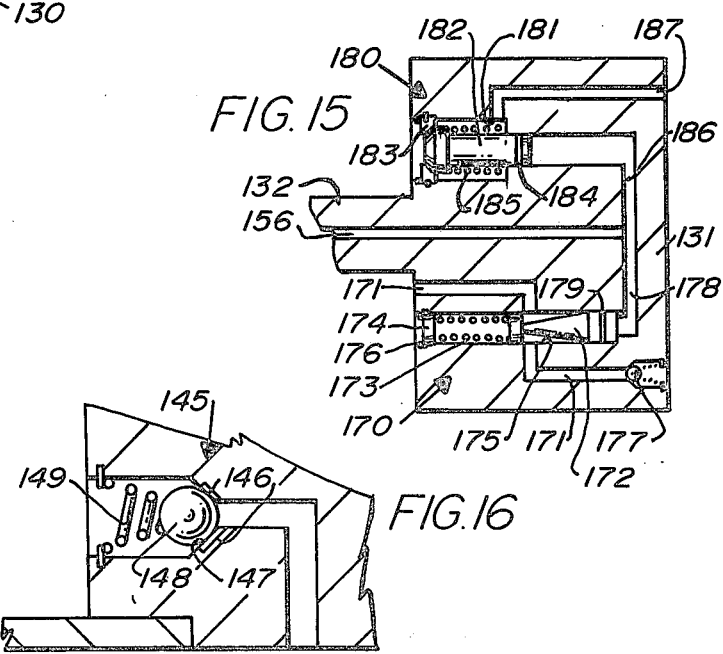
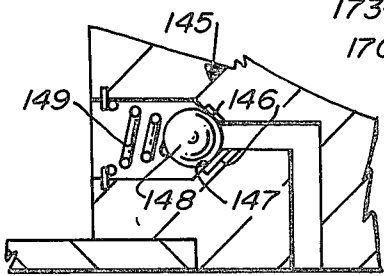

VEHICLE SUSPENSION WITH LOAD-CONTROLLED DAMPING AND LOAD-CONTROLLED DAMPER

This invention relates to an improved vehicle suspension having damping with characteristics that are varied by the load which the vehicle is carrying; it also relates to load controlled dampers.

BACKGROUND OF THE INVENTION

Both mechanical spring suspensions and air spring suspension systems are commonplace in heavy duty vehicles. Heretofore, both types of suspension systems have neglected for many purposes the results of applying a very large load to the suspension system. For example, truck tractors are often used to pull large semi-trailers with heavy loads. The semi-trailer may place on the truck suspension system loads that are ten times the load exerted thereon by the unloaded truck tractor.

To consider the effects of such loads, one may consider simplified dynamic models.

Consider first a mechanical spring (e.g., coil or leaf spring) system comprising a mass M1, a spring having stiffness K lbf/in, and a damper having damping coefficient C lbf/in/sec. As an example, suppose the system values are:

$$M_1 = 1.62 \text{ lbf sec}^2/\text{in (625 lbf weight)}$$

$$K = 5100 \text{ lbf/in}$$

$$C = 91 \text{ lbf/in/sec.}$$

These are fairly typical values for one "corner" of a tractor leaf spring rear suspension.

Then the system has an undamped natural frequency of $$f_{n1} = \frac{1}{2\pi} \sqrt{\frac{K}{M_1}} = 8.9 \text{ Hz,}$$

critical damping of $$C_{cr1} = 2\sqrt{KM_1} = 182 \text{ lbf/in/sec.,}$$

and a damping ratio of $$\zeta_1 = \frac{C}{C_{cr1}} = 0.50.$$

Now, suppose that a large mass is added to the system, such that the total mass M2 is substantially larger, say, ten times larger, than original mass M1. This is in fact the order of change in the load supported by the rear suspension that occurs when hooking up a laden semi-trailer to a tractor. Under the additional load, the spring deflects by an amount $$\delta = \frac{(M_2 - M_1)g}{K} = 1.10 \text{ in}$$

Now the undamped natural frequency is $$f_{n2} = \frac{1}{2\pi} \sqrt{\frac{K}{M_2}} = 2.8 \text{ Hz,}$$

the critical damping is $$C_{cr2} = 2\sqrt{KM_2} = 575 \text{ lbf/in/sec,}$$

and the damping ratio is $$\zeta_2 = \frac{C}{C_{cr2}} = 0.16.$$

Three things are immediately apparant:

(1) A high degree of spring stiffness is essential to avoid excessive static deflection under load.

(2) The combination of low mass and high stiffness results in a very high natural frequency in the light load condition, meaning that this system will be rather ineffective as a vibration isolator in the light load condition.

(3) A damping ratio that was optimal for the light load condition, gives only about 30% of the desired damping under the heavy load condition.

As a next model, consider a system utilizing an air spring and active leveling. In some manner, all such air suspension systems interpose an air spring between the vehicle axle and the frame. In a typical such system, suspension brackets are attached to the vehicle frame, and the lower ends of the brackets are pivotally connected to link assemblies made up of a flexible mechanical spring member and a rigid paddle member. The link assemblies are typically attached to the vehicle axles by U-bolts, while air springs of the rolling lobe type are interposed between the paddle member and the vehicle frame.

Most air spring suspension systems also employ active leveling in which the truck's high-pressure air supply is connected to the input of a leveling valve which, by means of a mechanical linkage, senses the distance between the vehicle frame and the axle. When the frame is low with respect to the axle, then, after a suitable delay, the leveling valve opens and admits air to the air springs, raising their internal pressure and causing the frame to rise until the desired ride height is reached. Similarly, if the frame is too high, relative to the axle, the leveling valve exhausts air from the air springs, reducing their internal pressure and causing the frame to lower to the desired ride height. It is usual to have a single leveling valve supply all air springs, so that the pressure in all the springs is the same.

Now consider such an air spring system employing active leveling. Suppose that the system values are:

$$M_1 = 1.62 \text{ lbf sec}^2/\text{in (625 lbf weight)}$$

$$K_1 = 185 \text{ lbf/in}$$

$$C = 17.3 \text{ lbf/in/sec.}$$

Again, these are fairly typical values for one "corner" of a tractor rear air suspension when unladen.

The system has an undamped natural frequency of $$fn_1 = \frac{1}{2\pi} \sqrt{\frac{K_1}{M_1}} = 1.70 \text{ Hz},$$

critical damping of $$C_{cr1} = 2\sqrt{K_1 M_1} = 34.6 \text{ lbf/in/sec.},$$

and a damping ratio of $$\zeta_1 = \frac{C}{C_{cr1}} = 0.50.$$

If, again, the mass of the system is increased by a factor of ten, there is extreme settling due to the low spring rate. However, the leveling valve senses this, and increases the air pressure in the air spring until the desired height is reached. Since air springs of the type under discussion maintain fairly constant bearing area regardless of their pressure, it follows that, since ten times more mass is supported in the fully loaded condition than in the light condition, the air spring pressure will also be ten times greater than the original pressure. This is a very important point: in air spring systems, the spring air pressure is proportional to the load supported.

It is inherent in the physics and thermodynamics of air springs of the type under discussion that the spring rate is directly proportional to the spring air pressure, and thus in turn is directly proportional to the mass supported. In general, if in supporting mass $M_1$ there is a spring rate $K_1$, in supporting a mass $M_2$ there will be a spring rate of $$K_2 = M_2/M_1 K_1$$

In the example just considered, therefore, in the heavy load condition the spring rate will be $K_2 = 1850$ lbf/in. The undamped natural frequency will be $$fn_2 = \frac{1}{2\pi} \sqrt{\frac{K_2}{M_2}} = \frac{1}{2\pi} \sqrt{\frac{K_1}{M_1}} =$$

$$\frac{1}{2\pi} \sqrt{\frac{K_1}{M_1}} = fn_1 = 1.70 \text{ Hz},$$

critical damping will be $$C_{cr2} = 2\sqrt{K_2 M_2} = 2\sqrt{\frac{M_2}{M_1} K_1 M_2} = 2 \frac{M_2}{M_1} \sqrt{K_1 M_1} =$$

$$\frac{M_2}{M_1} C_{cr1} = \frac{346 \text{ lbf}}{\text{in/sec}},$$

and the damping ratio will be $$\zeta_2 = \frac{C}{C_{cr2}} = 0.05.$$

Since the spring air pressure increases with the mass supported, and since spring stiffness increases with spring pressure, the natural frequency, unlike the mechanical spring system, is low even when unladen, and remains constant in going from the unladen to the laden condition. These are very desirable features from a vibration isolation standpoint, and are the principal reasons why air spring suspensions have gained such wide acceptance in the truck field.

However, in going from mass M1 to mass M2, the critical damping for the mechanical spring system is increased by the square root of the ratio of the masses, i.e., $$C_{cr2} = \sqrt{\frac{M_2}{M_1}} C_{cr1}$$

for a mechanical spring system, while for the air spring system, critical damping increases directly with the ratio of the masses, i.e., $$C_{cr2} = \frac{M_2}{M_1} C_{cr2}$$

for an air spring system. For this reason, a mechanical spring system which has its mass increased by a factor of ten will still retain about 30% of the desired damping level, while an air spring system subject to the same mass increase will retain only about 10% of the desired damping level.

When suspension systems have constant damping coefficients and support varying quantities of mass, they suffer some degradation in performance, but air spring systems suffer more degradation than mechanical spring systems.

Heretofore in this discussion it has been assumed that the damping is linear, i.e., that the dampers provide a force linearly proportional to the relative velocity of the axle and frame. In fact, automotive dampers are intentionally made non-linear.

As long as the relative velocity of the frame and the axle is small, as in normal minor oscillations of the suspension, a linear damper can be made to work well, but the suspension must occasionally traverse large obstacles such as rocks or lumber in the roadway. Under such circumstances, which involve very high relative velocities of the frame and axle, a linear damper tends to transmit excessive, even destructive force to the vehicle frame. Therefore most automotive dampers employ some sort of "blow-off" valving such that above a certain piston speed the damper force increases only slightly with velocity.

Most automotive dampers are non-linear in yet another way: since the shock loads caused by striking obstacles are generally associated with upward motions of the axle, the damping coefficient for jounce (compressing) travel is generally made less than the damping coefficient for rebound (extending) travel, the theory being that the light jounce damping allows the wheel to "get out of the way" of the obstacle, while the heavier rebound damping ensures that any subsequent oscillations of the wheel will be quickly damped out.

A linear damper with equal jounce and rebound damping has elliptical dynamometer curves, whereas a velocity-softening damper has more nearly rectangular dynamometer curves.

A general object of the invention is to provide improved ride characteristics for vehicles having wide variations in load.

An important object of the present invention is to provide a damper, for both mechanical spring suspensions and for air spring suspension systems, such that the damper has a damping coefficient which is variable and is always proportional to the quantity of mass supported. This is accomplished in air-suspension systems by using the suspension system air pressure, which is always proportional to the mass supported, to modulate the damping. For mechanical systems a special hydraulic pressure is generated, is made proportional to the mass supported, and is applied to modulate the damping.

A further object of the invention is to accomplish the preceding object while retaining the other features commonly found in automotive dampers, i.e., high speed blow-off valving, and different damping coefficients in the jounce and rebound directions.

SUMMARY OF THE INVENTION

The invention provides a vehicle suspension system with load-controlled damping. It is used with a vehicle having wheel supported axles and a frame, with either mechanical springs or air springs or both between the frame and the axles. When air springs are used, there is a compressed air supply on the frame for and connected to the air springs, and a leveling valve on the frame is actuated by changes in the distance between the axles and the frame, and sends compressed air into and bleeding air from the air springs.

The novel load-controlled damper is interposed between the axles and the frame. The damper includes a cylinder assembly comprising an outer cylinder, an inner cylinder inside said outer cylinder, an upper end closure, and a lower end closure. Both cylinders are closed at both ends, and the closure members space them apart to provide an annular space between them, the upper end of the inner cylinder ending below the upper end of the outer cylinder to provide an enlarged upper portion of the annular space. The lower end closure has a lower mounting bracket mounted to an axle assembly.

A piston in the inner cylinder has a piston rod extending through the upper end closure and secured at its upper end to the vehicle frame. The inner cylinder is filled with hydraulic fluid both above and below the piston, and the annular space is filled with the same fluid except for an air space at the top.

The cylinder assembly has:

(1) jounce-responsive metering means for removing the fluid in metered amount from below the piston and supplying a like amount of fluid above the piston upon downward movement of the piston.

(2) high-speed-jounce-responsive blow-off means for removing the fluid in larger amount from below the piston and supplying a like amount of the fluid above the piston upon high-velocity downward movement of the piston, (3) rebound-responsive metering means for removing fluid in metered amounts from above the piston and supplying a like amount of the fluid to below the piston upon upward movement of the piston, and (4) high-speed-rebound-responsive blow-off means for removing additional fluid from above the piston and supplying a like amount to below the piston upon high-velocity upward movement of the piston.

Load responsive means is connected to an axle and to the frame for providing a change in fluid pressure upon a change in load, and passage means transmits the pressure change from the load-responsive means to each of the metering means for varying the resistance of the metering means to the fluid passing through it and to each of blow-off means to vary its actuating conditions.

The passage means may be an upper pressure fitting in the piston rod and a passage leading axially through the piston rod and to the piston.

In one form of the invention the lower end closure contains a valve comprising part of the jounce-responsive metering means, and this valve passes the hydraulic fluid in metered amount from the lower chamber, the chamber below the piston, into the annular space, upon downward movement of the piston. The lower end closure also contains a valve comprising part of the high-speed-jounce blow-off means, and this valve passes the fluid in larger amount from the lower chamber into the annular space upon high-velocity downward movement of the piston.

In this form of the invention, the lower end closure also includes a one-way check valve for passing fluid from the annular space into the lower chamber under rebound conditions, and also a lower pressure fitting connected to the load responsive means, and a passage connecting the lower end of the jounce metering valve means and the lower end of the high-speed-jounce blow-off valve means to this lower pressure fitting. The low-speed-jounce metering valve then includes means for varying the fluid flow rate according to the pressure applied to the lower pressure fitting, which depends on the load on the frame. The actuation conditions of the high-speed-jounce blow-off valve means are also changed by the pressure applied to the pressure fitting.

In this same form of the invention the piston has a rebound metering valve for sending fluid in metered amounts from the upper chamber into the lower chamber of the inner cylinder upon upward movement of the piston. The rebound metering valve may include a normally closed one-way check valve for preventing back flow from the lower chamber to the upper chamber. The piston also has a high-speed-rebound blow-off valve for sending additional fluid from the upper chamber to the lower chamber upon high-velocity upward movement of the piston. Passage means connect the lower end of the rebound metering valve and the lower end of the high-speed-rebound blow-off valve to the upper pressure fitting. Since the pressure applied to the upper pressure fitting depends on the frame-supported load, this pressure acts to change the flow rate of the rebound metering valve and the actuation conditions of the high-speed-rebound valve.

The upper end closure has a normally closed check valve for enabling flow from the annular space into the upper chamber upon downward movement of the piston.

In another form of the invention, there is a check valve in each of the upper and lower end closures as before, for flow between the annular space and the inner cylinder. However, there is only one pressure fitting, that in the piston rod with a passage leading down into the piston.

In the piston are four valve systems:

(1) jounce metering valve means for passing hydraulic fluid in metered amount from below the piston to above the piston upon downward movement of the piston, there being a check valve to prevent reverse flow, (2) high-speed-jounce blow-off valve means for passing the fluid in larger amount from below the piston to above the piston upon high-velocity downward movement of the piston, (3) rebound metering valve means for sending fluid in metered amounts from above the piston to below the piston upon upward movement of the piston, this rebound metering valve means including check valve means for preventing reverse flow, and (4) high-speed-rebound blow-off valve means for sending additional fluid from above the piston to below the piston upon high-velocity upward movement of the piston.

The passage through the piston rod and into the piston transmits pressure from the single fitting to all of these four valve means with the effects already noted.

When air springs are used, the leveling valve may supply the pressure needed to transmit the load responsiveness to the various valve means.

In a mechanical system it is necessary to employ a different form of system for supplying this pressure. This may comprise another cylinder assembly having a cylinder with an upper closed end and a lower closed end, with an axial passage therein below and spaced from the cylinder with an outlet from the axial passage. The cylinder is substantially filled with hydraulic fluid, and the lower closed end may be secured to an axle. A first piston has large axial extending openings therethrough enabling relatively unimpeded movement thereof in the cylinder. This first piston has a first piston rod extending out through the upper closed end and secured to the frame.

A second piston is below and spaced from the first piston and has a second piston rod extending through a seal in the lower closed end and into the axial passage, the axial passage and outlet being filled with hydraulic fluid. Finally, in this device there is a mechanical spring between and bearing against both the first and second pistons. The pressure at the outlet from the axial passage is what is transmitted as the load-responsive pressure governing the jounce and rebound responsive valves.

BRIEF DESCRIPTION OF THE DRAWINGS

FIG. 1 is a fragmentary view in side elevation of a portion of a vehicle with a tandem axle suspension embodying the principles of the invention.

FIG. 2 is a fragmentary view in section taken along the line 2—2 in FIG. 1.

FIG. 3 is a diagrammatic view of a suspension system embodying the principles of the invention.

FIG. 4 is a view in elevation and in section of a load-controlled damper unit embodying the principles of the invention.

FIG. 5 is a fragmentary view in elevation and in section on an enlarged scale of the upper portion of the damper unit of FIG. 4.

FIG. 10 is a view similar to FIG. 3 of a modified form of suspension employing a pneumatic amplifier.

FIG. 11 is a view in elevation and in section of an auxiliary apparatus for transmitting load control to a damper like that of FIGS. 4 to 9, when used in a mechanical spring suspension system.

FIG. 12 is a view in elevation and in section of a modified form of damper which can be used in place of the damper of FIGS. 4 to 9.

FIG. 13 is a view taken along the line 13—13 in FIG. 12.

FIG. 14 is a fragmentary view of the piston, taken along the line 14—14 in FIG. 13.

FIG. 15 is a similar view taken along the line 15—15 in FIG. 13.

FIG. 16 is a fragmentary view in section showing the bypass check valve in the lower end closure member.

DESCRIPTION OF SOME PREFERRED EMBODIMENTS

Figure 6:
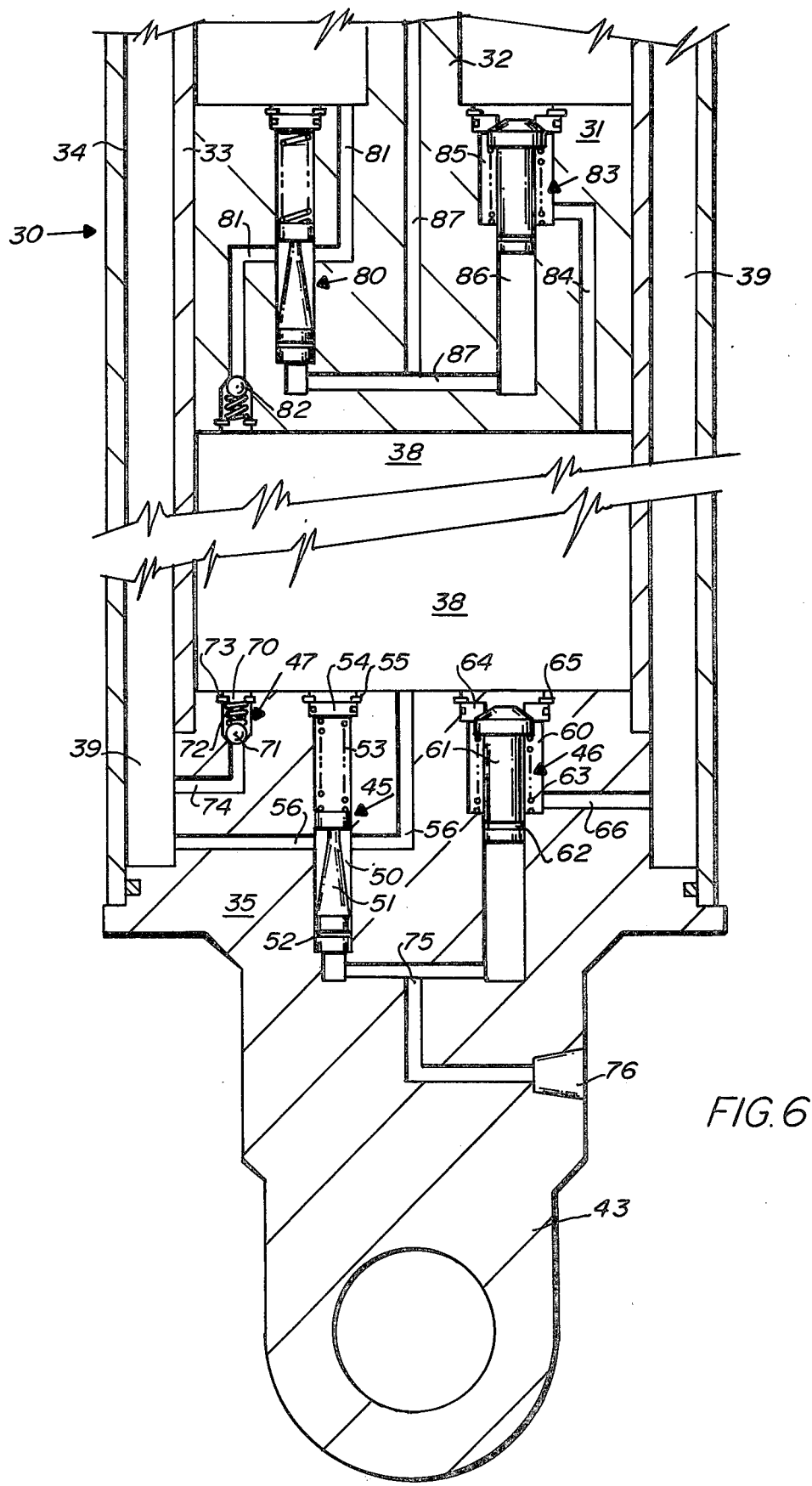
FIG. 6 is a similar view of a succeeding portion of the damper unit of FIG. 4 and of a still lower portion of the damper unit of FIG. 4, with a break between these two portions.

The basic vehicle air suspension of FIGS. 1 and 2

FIG. 1 shows a vehicle frame 10, such as a frame for a truck tractor, supported by a pair of axles 11 and 12 in tandem, each with at least one wheel (not shown) at each end. For each axle 11, 12 there is a suspension bracket 13 or 14 connected at its upper end to the frame 10. The lower end of each bracket 13 or 14 is connected pivotally to a link assembly 15 or 16 comprising a flexible mechanical spring assembly 17 or 18 and a rigid paddle member 19 or 20. U-bolts 21 and 22 secure the springs 17 and 18 to the axles 11 and 12, while an air spring 23 or 24 is interposed between each paddle member 19 or 20 and the vehicle frame 10.

As shown in FIGS. 2 and 3, a conduit 25 from the truck's high-pressure air supply is connected to an inlet fitting 26 of a leveling valve 27 having a mechanical linkage 28 that monitors the distance between the vehicle frame 10 and one of the axles 11 or 12. A conduit 29 connects the leveling valve 27 to each air spring 23, 24 etc. A bleed 102 is provided at the valve 27 for lowering the spring 23 and 24.

Between the frame 10 and each paddle member 19 and 20 is a damper 30 (FIG. 2) constructed according to the present invention.

The damper 30 (FIGS. 4–9)

FIGS. 4–9 show one embodiment of damper 30 for use in the invention. It comprises a piston 31 which is attached to a piston rod 32. The piston 31 slides in an inner cylinder 33 which is, in turn, enclosed in and spaced from an outer cylinder 34. The cylinders 33 and 34 are sealed at one end with a lower end cap 35, and at the other end by an upper end cap 36, through which the piston rod 32 passes. The piston 31 divides the inner cylinder 33 into an upper chamber 37 and a lower chamber 38. Between the inner and outer cylinders 33 and 34 is an outer chamber 39. The chambers 37, 38, and 39 are filled with hydraulic fluid, except that a small air reservoir 40 is left above the fluid in the chamber 39 to allow for changes in the volume of fluid displaced by the piston rod 32 when the piston 31 moves up and down in the inner cylinder 33. Appropriate seals 41 (FIG. 5) are fitted around the piston rod 32 to prevent fluid leakage. Upper and lower end fittings 42 and 43 are provided to attach the damper 30 to the frame 10 and the axle 11 or 12.

The lower end cap 35 is equipped with three valves; (see FIGS. 6–8) a jounce metering valve 45, a high-speed jounce blow-off valve 46, and a one-way check valve 47.

The metering valve 45 comprises a metering valve chamber 50 housing a slidable tapered metering needle 51 fitted with a seal 52. The needle 51 acts against a spring 53 held in place by an imperforate spring seat 54 and a retaining ring 55. The seat 54 also closes off the chamber 50 at all times. The metering needle 51 is interposed in an oil passage 56 connecting the lower chamber 38 and the outer chamber 39.

The high speed jounce blow-off valve 46 comprises a poppet valve chamber 60 housing a slidable poppet valve 61 fitted with a seal 62, the poppet valve 61 normally being held by a spring 63 against a tapered valve seat 64, which in turn is secured by a retaining ring 65. An oil passage 66 joins the poppet valve chamber 60 with the outer chamber 39.

The check valve 47 comprises a check valve chamber 70 containing a ball 71 which is normally held in place against the base of the chamber 70 by a spring 72, which in turn is retained by a retaining ring 73. An oil passage 74 joins the check valve chamber 70 with the outer chamber 39.

The lower ends of the metering valve chamber 50 and the poppet valve chamber 60 are connected by a passage 75 leading to a threaded connector 76 in the lower end fitting 43.

The piston 31 contains similar valving, which will be described in less detail, because the structure is substantially what has already been described above (see FIG. 9). A rebound metering valve 80 is interposed in an oil passage 81 connecting the upper chamber 37 to the lower chamber 38. A check valve 82 is fitted in the lower end of the passage 81. There is also a high-speed rebound blow-off valve 83. A passage 84 connects a poppet valve chamber 85 with the lower chamber 38. The lower end of the rebound metering valve 80 and the lower end of a high-speed rebound blow-off valve chamber 86 are connected by a passage 87, which leads through the piston rod 32 to a threaded connection 88 in the upper end fitting.

The upper end cap 36 (FIG. 5) contains a passage 90 connecting the upper chamber 37 to the outer chamber 39, and the passage 90 is equipped with a check valve 91.

Connection of the damper 30 to the suspension system
(FIG. 3)

The connections 76 and 88 are connected via air lines 92, 93, and 94 to an output fitting 95 of the suspension system leveling valve 27, from which air lines 95 and 29 lead to the air springs 23, etc., thus pressurizing the passages 75 and 87 (see FIGS. 5–9) to the same pressure as exists in the suspension air springs 23 and 24.

OPERATION

There are eight possible regimes of operation:

1. Low-speed jounce under light load conditions (FIGS. 5 and 6)

A "jounce" is frame travel relative to the axle causing the piston 31 to move down relative to the inner cylinder 33. Under conditions of light load and low piston speed, downward movement of the piston 31 causes the oil to flow through the passage 56 and around the relatively slender portion of the tapered jounce metering needle 51, which is in its FIG. 6 position. The check valve 82 and the poppet valve 83 prevent any oil flow upwards through the piston 31. Meanwhile, oil flows, essentially without restriction, into the upper chamber 37 through the check valve 91 (FIG. 5).

Figure 8:
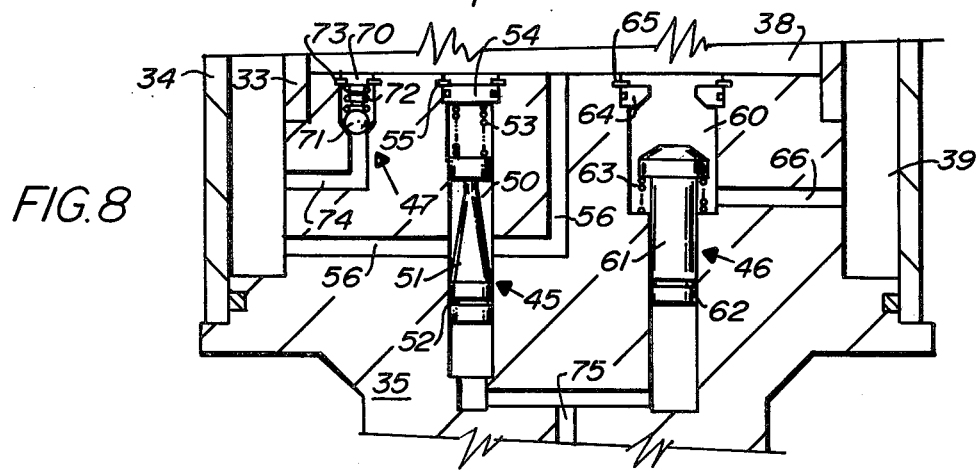
FIG. 8 is a view similar to FIG. 7 showing the same position during high-load and high-speed jounce conditions.

2. High-speed jounce under light load conditions (FIGS. 6 and 8)

If the conditions are the same except that the piston 31 travels at a high speed, sufficient pressure is developed in the lower chamber 38 to open the high-speed jounce blow-off valve 46. Oil flows through the metering valve 45 as before, for it remains in its FIG. 6 position, but now a sudden large passage of oil through the blow-off valve 46, which is moved to its FIG. 8 position, prevents the damper 30 from transmitting high loads to the vehicle frame 10. Oil again flows from the space 39 into the upper chamber 37 via the check valve 91.

Figure 7:
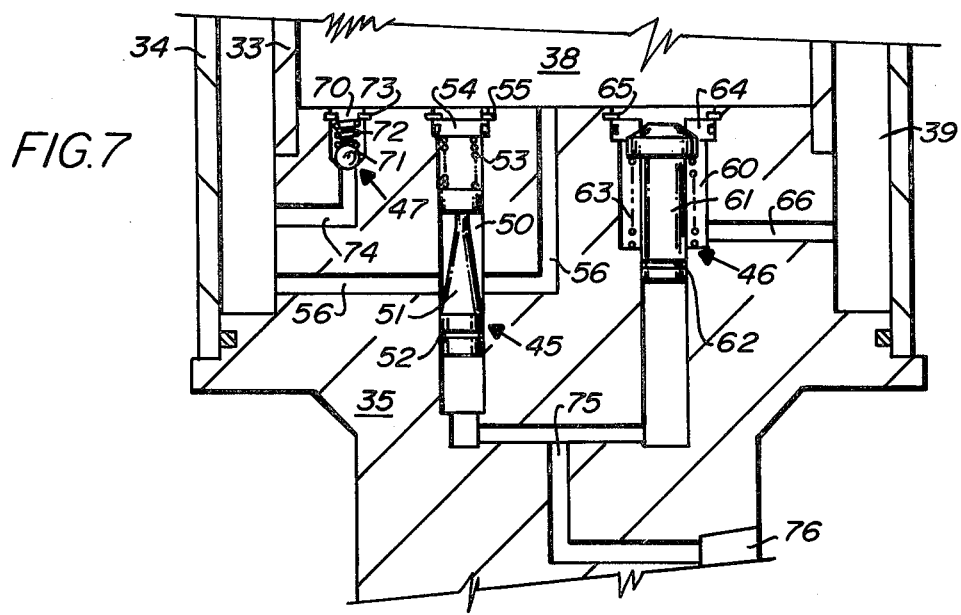
FIG. 7 is a view similar to the bottom portion of FIG. 6 of the device during high-load and low-speed jounce conditions.

3. Low-speed jounce under heavy load conditions (FIG. 7)

Low-speed piston operation when the system is fully laden (as by hooking the truck tractor to a semi-trailer) results in increased air pressure being applied to the fittings 76 and 88. This pressure is now sufficient to overcome the force of the spring 53 in the jounce metering valve 45, causing the tapered metering needle 51 to slide up into a position shown in FIG. 7 which offers greater resistance to the flow of oil in the passage 56. This meets the goal of offering higher damping when the suspension is laden. Except for the position of the needle 51, operation is the same as under regime 1.

4. High-speed jounce under heavy load conditions (FIG. 8)

The heavy load applies, via the passage 75, relatively high air pressure to the base of the poppet valve 61, causing the high-speed jounce blow-off valve 46 to open less readily than it did under light load conditions. However, when the piston speed is high enough, sufficient fluid pressure is built up in the chamber 38 to overcome both the force of the spring 63 and the high air pressure in the passage 75. The metering valve 45 acts again as in regime 3, and so does the check valve 91.

5. Low-speed rebound under light load (FIGS. 5 and 6)

"Rebound" corresponds to upward movement of the piston 31. The valve 45 is as in FIG. 6, and the valve 46 is closed, as is the check valve 91 (FIG. 5). Flow is then forced through the rebound metering valve 80 via the passage 81 and the now-open check valve 82. Meanwhile, fluid in the lower chamber 38 is replenished by essentially unrestricted flow through the now-open check valve 47 in the lower end cap 35.

6. High-speed rebound under light load (FIGS. 6 and 9)

Figure 9:
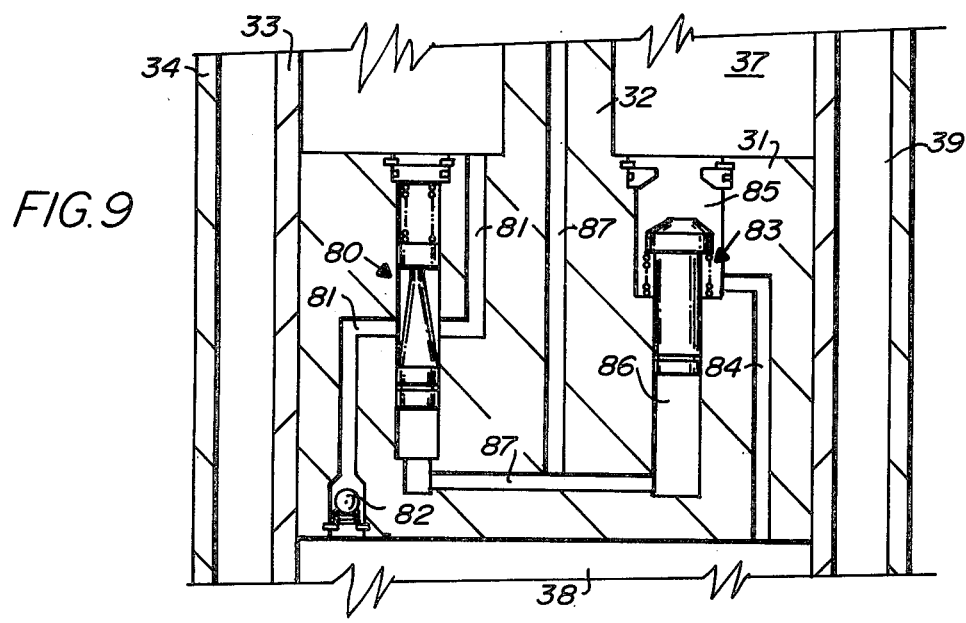
FIG. 9 is a similar view of the upper portion of FIG. 6 showing the piston under high-load and high-speed rebound conditions.

Oil continues to flow as in regime 5 via the passage 81 (FIG. 6 position) but in addition, high-speed rebound causes the blow-off valve 83 to open to its FIG. 9 position and move more oil quickly from the chamber 37 into the chamber 38.

7. Low-speed rebound under heavy load (FIGS. 5, 6, and 9)

A heavy load causes the leveling valve 27 to increase the air pressure applied to the fitting 88 (FIG. 5) and therefore to the passage 87 and from there to act on the metering valve 80, raising its tapered needle against the pressure of its spring to its FIG. 9 position. The increased pressure in the passage 87 also increases the uppermost pressure of the blow-off valve 83 (which remains in its FIG. 6 position), against its seat. During low-speed rebound under heavy load conditions therefore, there is more resistance to fluid flow through the metering valve 80, so that, in effect, the damper is "stiffer".

8. High-speed rebound under heavy load (FIG. 9)

In addition to the action in regime 7, the blow-off valve 83 opens at its new, higher, critical fluid pressure so that both of the valves 80 and 83 are in the FIG. 9 position.

It should be noted that in, for example, the jounce direction, the amount of damping present at any combination of load and piston speed may be tailored more or less at will by varying the size and taper of the metering needles, the diameters of the valve stems and passages, the rate and preset of the valve springs, and so on. Furthermore, such control can be exercised completely independently over the damping in the jounce and rebound directions.

Pressure multiplication (FIG. 10)

One refinement is shown in FIG. 10. Should it be found that the fluid pressures obtained in the chambers 37 and 38 are so large that the suspension air spring pressures are inadequate to control the damper's internal valving, it is relatively easy to place a pressure multiplying device 96 in the line 94 leading from the leveling valve 27 to the damper 30. The device 96 comprises two cylinders 97 and 98 and a piston 99 having a large-area-end 100 in the larger cylinder 97 and a small-area-end 101 in the smaller cylinder 98. The pressure exerted in the cylinder 97 is therefore multiplied in the cylinder 98. It may further be beneficial to use a pressure-multiplying device employing an air-over-oil interface. The damper's internal valving is then controlled by high-pressure oil instead of air. This has the advantage of maintaining the rather delicate valve parts in a constant oil bath, rather than being exposed to hot, moist, corrosive, and possibly contaminated air.

Application of the invention to mechanical spring systems

A principal difference between mechanical spring suspensions and active air spring suspensions is that while air spring suspensions settle under load, but then recover to their unladen ride height, mechanical spring suspensions settle under load and remain deflected until the load is removed.

For this reason, previous load-controlled dampers for mechanical spring suspensions have used this change in displacement under load as the "signal" which is used to vary restriction to fluid flow, and hence, damping coefficient. A problem arose, however, because the suspension was constantly moving up and down under the influence of irregularities in the road surface. Therefore, if the damping coefficient were always directionly proportional to the suspension displacement, the damping coefficient would be constantly fluctuating. What is desired is that the damping coefficient be proportional to the mean suspension displacement, rather than the instantaneous suspension displacement.

To do this, the load-controlled damper 30 must in some way be adapted to a mechanical spring suspension. Since the damper 30 is controlled by fluid pressure, and the signal now to be used is suspension displacement, a displacement-to-pressure transducer is required.

An embodiment of a suitable displacement-to-pressure transducer 110 is shown in FIG. 11. This transducer 110 comprises a cylindrical body 111 enclosing a chamber 112 filled with oil 113. An upper piston 114 is slidable in the chamber 112 and is attached to an upper piston rod 115, which in turn may be attached by means of a fitting 116 to a vehicle frame. A similar fitting 117 joined to the lower end of the cylinder body 111 may be attached to the vehicle axle. The upper piston 114 is provided with several large orifices 118 so that it can move up and down within the chamber 112 essentially without restriction. A seal 119 is fitted where the piston rod 115 passes through the cylinder body 111.

The chamber 112 also contains a lower piston 120 attached to lower piston rod 121. A spring 122 is interposed between the upper piston 114 and the lower piston 120. The lower piston 120 is provided with a relatively small orifice 123 such that it can only move slowly in response to any change in the force exerted through the spring 122. A seal 124 is fitted about the lower piston rod 121, and below the lower piston rod 121 is an additional chamber 125 filled with oil 126. The chamber 125 has a port 127 which is connected by suitable conduits directly to the control ports 76 and 88 of the load-controlled damper 30.

In operation, the transducer 110 is interposed between the frame and axle of an unladen vehicle equipped with a mechanical spring suspension, the fitting 116 being attached to the frame and the fitting 117 being attached to the axle. When an additional load is applied to the vehicle frame, the frame settles on the suspension springs, causing the upper piston 114 to travel downwardly, compressing the spring 122, so that the lower piston 120 gradually descends in its cylinder bore 112, its rate of descent being governed by the size of its orifice 123. This, in turn, causes an increase in the pressure of the oil 126 in the chamber 125, which pressurizes the metering needles of the metering valves 45 and 80 and also the pop-off-valves 46 and 83 in the load-controlled damper 30, just as when they are pressurized by air suspension air spring pressure.

When the vehicle is driven, the upper piston 114 undergoes relatively rapid up-and-down oscillations, so that the force exerted by spring 122 likewise undergoes rapid oscillations. However, the motion of the lower piston 120 is heavily damped so that it is insensitive to this kind of excitation and tends to remain immobile in its cylinder bore 112.

Thus, by means of the displacement transducer 110 the load-controlled damper 30 can be adapted to use with a mechanical spring suspension, and, furthermore, can be made to have a damping coefficient which is proportional to the mean suspension displacement.

A modified form of load-controlled damper (FIGS. 12-16)

An objection which might be raised to the load-controlled damper 30 is that it requires that high pressure air or oil be supplied to both ends of the damper 30. It would be preferable to have air or hydraulic lines lead to only one end of the damper, preferably its upper end, which is attached to the frame, rather than the lower end, which is attached to the axle.

FIGS. 12-16 show such a damper 130 in which both the jounce and rebound damping are basically incorporated in its piston 131.

The piston 131 is attached to a piston rod 132 and slides in an inner cylinder 133 which is, in turn, enclosed in and spaced from an outer cyliner 134. The cylinders 133 and 134 are sealed at one end with a lower end cap 135, and at the other end by an upper end cap 136, through which the piston rod 132 passes. The piston 131 divides the inner cylinder 133 into an upper chamber 137 and a lower chamber 138. Between the outer and inner cylinders 133 and 134 is an outer chamber 139. The chambers 137, 138, and 139 are filled with hydraulic fluid, except that a small air reservoir 140 is left above the fluid in the chamber 139 to allow for changes in the volume of fluid displaced by the piston rod 132 when the piston 131 moves up and down in the inner cylinder 133. Appropriate seals 141 are fitted around the piston rod 132 to prevent fluid leakage. Upper and lower end fittings 142 and 143 are provided to attach the damper 130 to the frame 10 and the axle 11 or 12.

The lower end cap 135 is equipped with a by-pass check valve 145 (see FIG. 16), grooves 146 being provided in a valve seat 147 so that a small oil passage is available even when the ball member 148 is engaged with the seat 147. The valve 145 has the usual spring 149.

The piston 131 has four valves: a jounce metering valve 150, a high-speed-jounce blow-off valve 160, a rebound metering valve 170, and a high-speed-rebound blow-off valve 180.

The metering valve 150 (see FIG. 14) comprises a metering valve chamber 151 housing a slidable tapered metering needle 152 fitted with a seal 153. The needle 152 is urged against a spring 154 by the pressure applied to a fitting 155 at the distal end of the piston rod 132 and transmitted by a passage 156 through the piston rod 132 and thence to the metering needle 152 by a passage 157. The spring 154 is retained in place and the chamber 151 closed off by an imperforate spring seat 158 held in place by a retaining ring 159. The metering needle 152 is interposed in an oil passage 161 which connects the lower chamber 138 to the upper chamber 137. Flow through the passage 161 in the reverse direction is prevented by a check valve 162.

The high speed jounce blow-off valve 160 (FIG. 14) comprises a poppet valve chamber 163 housing a slidable poppet valve 164 fitted with a seal 165. The poppet valve 164 is normally urged to a closed position by a spring 166, urging it against a tapered valve seat 167. On blow-off the fluid flows from the chamber 138 through a passage 168 to the chamber 137. A passage 169 leads from the base of the stem of the poppet valve 164 to the passage 156 through the piston rod.

The piston 131 also contains a rebound metering valve 170 (FIG. 15) interposed in an oil passage 171 connecting the upper chamber 137 to the lower chamber 138. The valve 170 comprises a valve chamber 175 housing a tapered metering needle 172 provided with a seal 179. The metering needle 172 is normally urged downwardly by a spring 173. The spring 173 is held in place and the valve chamber 175 closed off by a spring seat 174 held in place by a retaining ring 176. A passage 178 transmits the pressure in the piston-rod passage 156 to the metering needle member 172. A check valve 177 is fitted in the lower end of the passage 171.

Finally, the piston 131 also has a high-speed rebound blow-off valve 180 (FIG. 15). The valve 180 has a poppet valve chamber 181 leading from the chamber 137 with a poppet valve 182 in the chamber 181 and normally seated against a tapered seat 183. The valve 182 has a seal 184 and is urged toward the seat 183 by a spring 185. A passage 186 leads from the base of the stem of the poppet valve 182 to the passage 156. A passage 187 connects the poppet valve chamber 181 to the lower chamber 138.

The upper end cap 136 (FIG. 12) contains a passage 190 connecting the upper chamber 137 to the outer chamber 139, and the passage 190 is equipped with a simple check valve 191.

As the piston travels downwards, in the jounce (compressing) direction, through a distance d, the lower chamber 138 decreases in volume by d x piston area, that is, that volume of fluid must be expelled from the lower chamber 138. Meanwhile, the upper chamber 137 has only expanded by d x (piston area—rod area), because the piston rod 132 is simultaneously entering further into the upper chamber 137 as the piston 131 moves downward. The upper chamber 137 is thus incapable of accepting all the fluid expelled from the lower chamber 138. For this reason, the bypass check valve 145 is provided, to accommodate the excess of flow out of the lower chamber 138 by passing it into the annular chamber 139.

Under some conditions, for example, when the vehicle is heavily loaded and the low-speed jounce oil passage 161 is consequently at its most restrictive, there may be a tendency for less fluid to flow through the piston 131 than is needed to keep the upper chamber 137 completely filled; in this case the upper chamber 137 would tend to cavitate, but to prevent this, the check valve 191 has been provided.

Flow for the high-speed jounce blow-off valve 160 is quite simple: The poppet 164 is moved away from its seat 167, and fluid flows from the chamber 138 into the chamber 137 via a passage 168.

In rebound operation the situation is somewhat reversed from that in jounce. As the piston 131 moves upward, the fluid displaced from the upper chamber 137 must pass through the piston 131 and into the lower chamber 138, but, because of the effect of rod volume, this passage of fluid is not adequate to keep the lower chamber 138 filled. Hence, the bypass check valve 145 opens and provides adequate fluid to replenish the lower chamber 138. The rebound flow patterns for high piston speeds and heavily laden conditions are as described earlier.

To those skilled in the art to which this invention relates, many changes in construction and widely differing embodiments and applications of the invention will suggest themselves without departing from the spirit and scope of the invention. The disclosures and the descriptions herein are purely illustrative and are not intended to be in any sense limiting.

What is claimed is:

1. A vehicle suspension system with load-controlled damping, including in combination:
   a vehicle having wheel-supported axles and a frame with an interposed spring-suspension system between said axles and said frame,
   load-controlled damper means between said axles and said frame, said damper comprising
   a cylinder assembly having an upper closed end and a lower closed end and comprising an outer cylinder and an inner cylinder inside said outer cylinder with an annular space between them, said lower end being mounted to a said axle,
   a piston in said inner cylinder with a piston rod extending through said upper end and secured at its upper end to said frame,
   said inner cylinder being filled with hydraulic fluid both above and below said piston, said annular space being filled with the same fluid except for an air space at the top,
   jounce-responsive metering means in said assembly for removing said fluid in metered amount from below said piston and supplying a like amount of fluid above said piston upon downward movement of said piston,
   high-speed-jounce-responsive blow-off means in said assembly for removing said fluid in larger amount from below said piston and supplying a like amount of said fluid above said piston upon high-velocity downward movement of said piston,
   rebound-responsive metering means in said assembly for removing fluid in metered amounts from above said piston and supplying a like amount of said fluid below said piston upon upward movement of said piston,
   high-speed-rebound-responsive blow-off means in said assembly for removing additional fluid from above said piston and supplying a like amount below said piston upon high-velocity upward movement of said piston,
   load responsive means connected to a said axle and to said frame for providing a change in pressure upon a change in load, and
   passage means transmitting said pressure change from said load-responsive means to each of said metering means for varying the resistance of said metering means to said fluid passing through it and to each of said blow-off means to vary its actuating conditions.

2. The vehicle suspension system of claim 1 wherein said jounce-responsive metering means comprises jounce metering valve means in said lower closed end for passing said fluid in metered amount from below said piston into said annular space upon downward movement of said piston, and
   check valve means in said upper closed end for enabling flow from said annular space into said inner cylinder above said piston upon downward movement of said piston.

3. The vehicle suspension system of claim 2 wherein said jounce metering valve means comprises a cylindrical chamber extending parallel to the axis of said inner cylinder and closed at its upper end, a sliding tapering needle in said chamber, wider at the bottom than at the top and having a seal near the bottom, a spring above said needle urging it normally downwardly, and a passage leading across said cylindrical chamber below said spring and having an inlet opening into the bottom of said inner cylinder and an outlet opening into said annular space.

4. The vehicle suspension system of claim 2, wherein said high-speed-jounce-responsive means comprises, in addition to said check valve means, a high-speed-jounce blow-off valve means in said lower closed end for passing said fluid in larger amount from below said piston into said annular space upon high-velocity downward movement of said piston.

5. The vehicle suspension system of claim 4 wherein said high-speed-jounce blow-off valve means comprises a poppet chamber extending in the axial direction down from the bottom of said cylinder, a tapered valve seat at the top of said chamber, a poppet valve in said poppet chamber, a spring normally holding said poppet valve against said seat, and a passage leading from a position below said seat into said annular space.

6. The vehicle suspension system of claim 1 wherein said rebound-responsive metering means comprises
   rebound metering valve means in said piston for sending fluid in metered amounts from above said piston to below said piston upon upward movement of said piston, said rebound metering valve means including piston-contained check valve meants for preventing reverse flow, and another
   check valve means in said lower closed end for passing said fluid from said annular space into said inner cylinder below said piston under rebound conditions.

7. The vehicle suspension system of claim 6 wherein said rebound metering valve means comprises a cylindrical chamber extending in the axial direction and closed at its upper end, a sliding tapering needle in said chamber, wider at the bottom than at the top and having a seal at the bottom, a spring above said needle urging it normally downwardly, and a passage leading across said cylindrical chamber below said spring and having an inlet at the upper end of said piston and an outlet though the lower end of said piston, said piston-contained check valve means lying between said outlet and said cylindrical chamber and preventing flow from said outlet to said inlet.

8. The vehicle suspension system of claim 6 wherein said high-speed-rebound-responsive blow-off means comprises, in addition to said check valve means in said closed end, a high-speed-rebound blow-off valve means in said piston for sending additional fluid from above said piston to below said piston upon high-velocity upward movement of said piston.

9. The vehicle suspension system of claim 8 wherein said high-speed-rebound blow-off valve means comprises a poppet chamber extending down in an axial direction from the upper end of said piston, a tapered valve seat at the top of said chamber, a poppet valve in said poppet chamber, a spring normally holding said poppet valve against said seat, and a passage leading from a position below said seat to the bottom of said piston.

10. The vehicle suspension system of claim 1, said piston dividing said inner cylinder into an upper chamber and a lower chamber wherein said jounce-responsive metering means, said high-speed-jounce-responsive blow-off means, said rebound responsive metering means, and said high-speed-rebound responsive blow-off means comprise
    jounce metering valve means in said lower closed end for passing said fluid in metered amount from said lower chamber into said annular space upon downward movement of said piston, high-speed-jounce blow-off valve means in said lower closed end for passing said fluid in larger amount from said lower chamber into said annular space upon high-velocity downward movement of said piston, first one-way check valve means in said lower closed end for passing said fluid from said annular space into said lower chamber under rebound conditions, rebound metering valve means in said piston for sending fluid in metered amounts from said upper chamber into said lower chamber upon upward movement of said piston, high-speed-rebound blow-off valve means in said piston for sending additional fluid from said upper chamber to said lower chamber upon high-velocity upward movement of said piston, said rebound metering valve means including normally closed second one-way check valve means for preventing back flow from said lower chamber to said upper chamber, normally closed third check valve means in said upper closed end for enabling flow from said annular space into said upper chamber upon downward movement of said piston.

11. The vehicle suspension system of claim 10 wherein said passage means comprise a lower fitting in said lower closed end, a first passage connecting both the lower end of said jounce metering valve means and the lower end of said high-speed-jounce blow-off valve means to said lower fitting, an upper fitting in said piston rod, and a second passage in said piston rod and said piston connected to the lower end of said rebound metering valve means and to the lower end of said high-speed-rebound blow-off valve means, the pressure applied to said lower pressure fitting and to said upper pressure fitting by said load-responsive means depending on the frame-supported load and acting to change the flow rates of said jounce metering valve means and said rebound metering valve means and the actuation conditions of said high-speed-jounce blow-off valve means and said high-speed-rebound valve means.

12. The vehicle suspension system of claim 1, said lower closed end having by-pass check valve means for passing said fluid from said annular space into said inner cylinder below said piston, under rebound conditions, said upper closed end having check valve means for enabling flow from said annular space into said inner cylinder above said piston under jounce conditions, said piston having (1) jounce metering valve means for passing said fluid in metered amount from below said piston to above said piston upon downward movement of said piston check valve and means preventing reverse flow through said metering valve means, (2) high-speed-jounce blow-off valve means for passing said fluid in larger amount from below said piston into said annular space upon high-velocity downward movement of said piston, (3) rebound metering valve means for sending fluid in metered amounts from above said piston to below said piston upon upward movement of said piston, said rebound metering valve means including check valve means for preventing reverse flow, and (4) high-speed-rebound blow-off valve means for sending additional fluid from above said piston to below said piston upon high-velocity upward movement of said piston.

13. The vehicle suspension system of claim 12 wherein said passage means comprises an upper fitting in said piston rod connected to said load-responsive means, a passage leading through said piston rod into said piston and passages in said piston leading therefrom into the lower ends of each of said jounce metering valve means to vary its resistance to said passing of said fluid therethrough, said high-speed-jounce blow-off valve means to vary its actuation conditions, said rebound metering valve means for varying its resistance to said fluid passing through it and said high-speed-rebound blow-off valve means to vary its actuating conditions.

14. The vehicle suspension system of claim 1 wherein said interposed spacing system incorporates air springs.

15. The vehicle suspension system of claim 1 wherein said interposed spring system is a mechanical spring system.

16. A vehicle suspension system with load-controlled damping, including in combination:

a vehicle having wheel supported axles and a frame, air-spring means between said frame and said axles, compressed air supply means on said frame for and connected to said air spring means, a leveling valve on said frame actuated by changes in the distance between said axles and said frame and connected to said air-spring means and to said air supply means and having bleed means, for sending compressed air into and bleeding air from said air spring means, and a cylinder assembly having an upper closed end and a lower closed end and comprising an outer cylinder and an inner cylinder inside said outer cylinder with an annular space between them, said lower end being mounted to a said axle, a piston in said inner cylinder with a piston rod extending through said upper end and secured at its upper end to said frame, said inner cylinder being filled with hydraulic fluid both above and below said piston, said annular space being filled with the same fluid except for an air space at the top, jounce-responsive metering means in said assembly for removing said fluid in metered amount from below said piston and supplying a like amount of fluid above said piston upon downward movement of said piston, high-speed-jounce-responsive blow-off means in said assembly for removing said fluid in larger amount from below said piston and supplying a like amount of said fluid above said piston upon high-velocity downward movement of said piston, rebound-responsive metering means in said assembly for removing fluid in metered amounts from above said piston and supplying a like amount of said fluid to below said piston upon upward movement of said piston, high-speed-rebound-responsive blow-off means in said assembly for removing additional fluid from above said piston and supplying a like amount to below said piston upon high-velocity upward movement of said piston, and passage means transmitting said pressure from said leveling valve to each of said metering means for varying its resistance to said fluid passing through it and to each of said blow-off means to vary its actuating conditions.

17. A vehicle suspension system with load-controlled damping, including in combination:

a vehicle having wheel supported axles and a frame, a mechanical spring system between said frame and said axles, load-controlled damper means between said axles and said frame, said damper including in combination:

a first cylinder assembly having a first cylinder with an upper closed end and a lower closed end, with an axial passage therein below and spaced from said cylinder with an outlet from said axial passage, said cylinder being substantially filled with hydraulic fluid, said lower closed end being secured to a said axle, a first piston in said first cylinder and having large axially extending openings therethrough enabling relatively unimpeded movement thereof in said cylinder, said first piston having a first piston rod extending out through said upper closed end and secured to said frame, a second piston in said first cylinder below said first piston and having a second piston rod extending through a seal in said lower closed end and into said axial passage, said axial passage and outlet being filled with hydraulic fluid, and a mechanical spring between and bearing against said first and second pistons, a second cylinder assembly having a second upper closed end and a second lower end and comprising an outer cylinder and an inner cylinder inside said outer cylinder with an annular space between them, said lower end being mounted to a said axle, a third piston in said inner cylinder with a third piston rod extending through said second upper end and secured at its upper end to said frame and having an upper fitting connected to said outlet from said axial passage of said first cylinder, said inner cylinder being filled with hydraulic fluid both above and below said third piston, said annular space being filled with the same fluid except for an air space at the top, jounce-responsive metering means in said second cylinder assembly for removing said fluid in metered amount from below said third piston and supplying a like amount of fluid above said third piston upon downward movement of said piston, high-speed-jounce-responsive blow-off means in said second cylinder assembly for removing said fluid in larger amount from below said third piston and supplying a like amount of said fluid above said third piston upon high-velocity downward movement of said third piston, rebound-responsive metering means in said second cylinder assembly for removing fluid in metered amounts from above said third piston and supplying a like amount of said fluid to below said third piston upon upward movement of said third piston, high-speed-rebound-responsive blow-off means in said second cylinder assembly for removing additional fluid from above said third piston and supplying a like amount to below said piston upon high-velocity upward movement of said third piston, and passage means transmitting said pressure from said axial passage of said first cylinder assembly to each of said metering means for varying its resistance to said fluid passing through it and to each of said blow-off means to vary its actuating conditions.

18. A vehicle suspension system with load-controlled damping, including in combination:

a vehicle having wheel supported axles and a frame, air-spring means between said frame and said axles, compressed air supply means on said frame for and connected to said air spring means, a leveling valve on said frame actuated by changes in the distance between said axles and said frame and connected to said air-spring means and to said air supply means and having bleed means, for sending compressed air into and bleeding air from said air spring means, and load-controlled damper means between said axles and said frame, said damper including in combination:

a cylinder assembly having an upper closed end and a lower closed end and comprising an outer cylinder and an inner cylinder inside said outer cylinder with an annular space between them, said lower end being mounted to a said axle, a piston in said inner cylinder with a piston rod extending through said upper end and secured at its upper end to said frame and having an upper fitting connected to said leveling valve, said inner cylinder being filled with hydraulic fluid both above and below said piston, said annular space being filled with the same fluid except for an air space at the top, said lower closed end having jounce metering valve means for passing said fluid in metered amount from below said piston into said annular space upon downward movement of said piston, high-speed-jounce blow-off valve means for passing said fluid in larger amount from below said piston into said annular space upon high-velocity downward movement of said piston, check valve means for passing said fluid from said annular space into said inner cylinder below said piston under rebound conditions, and a lower fitting connected to said leveling valve and transmitting pressure therefrom to said jounce metering valve means to vary its resistance to said passing of said fluid therethrough, and to said high-speed-jounce blow-off valve means to vary its actuation conditions, said piston having rebound metering valve means for sending fluid in metered amounts from above said piston to below said piston upon upward movement of said piston, said rebound metering valve means including check valve means for preventing reverse flow, a high-speed-rebound blow-off valve means for sending additional fluid from above said piston to below said piston upon high-velocity upward movement of said piston, and passage means transmitting pressure from said upper fitting to said rebound metering valve means for varying its resistance to said fluid passing through it and to said high-speed-rebound blow-off valve means to vary its actuating conditions, said upper closed end having check valve means for enabling flow from said annular space into said inner cylinder above said piston upon downward movement of said piston.

19. A vehicle suspension system with load-controlled damping, including in combination:
a vehicle having wheel-supported axles and a frame,
air-spring means between said frame and said axles,
compressed air supply means on said frame for and connected to said air spring means,
a leveling valve on said frame actuated by changes in the distance between said axles and said frame and connected to said air-spring means and to said air supply means and having bleed means, for sending compressed air into and bleeding air from said air-spring means, and
load-controlled damper means between said axles and said frame, said damper including in combination:
a cylinder assembly having an upper end and a lower end and comprising an outer cylinder, an inner cylinder inside said outer cylinder, an upper end closure, and a lower end closure, closing both said cylinders at both ends and spacing them apart to provide an annular space between them, said lower end closure having a lower mounting bracket mounted to a said axle, the upper end of the inner cylinder ending below the upper end of the outer cylinder to provide an enlarged upper portion of said annular space,
a piston in said inner cylinder with a piston rod extending through said upper end closure and having an upper mounting bracket at its upper end secured to said frame and having an upper fitting connected to said leveling valve, said piston dividing said inner cylinder into an upper chamber and a lower chamber,
said inner cylinder being filled with hydraulic fluid both above and below said piston, said annular space being filled with the same fluid except for an air space in its enlarged upper portion,
said lower end closure having jounce metering valve means for passing said fluid in metered amount from said lower chamber into said annular space upon downward movement of said piston, high-speed-jounce blow-off valve means for passing said fluid in larger amount from said lower chamber into said annular space upon high-velocity downward movement of said piston, first one-way check valve means for passing said fluid from said annular space into said lower chamber under rebound conditions, a lower fitting connected to said leveling valve, and first passage means connecting the lower end of said jounce metering valve means and the lower end of said high-speed-jounce blow-off valve means to said lower fitting, said jounce metering valve means for including means for varying the fluid flow rate according to the pressure applied to said lower fitting by said leveling valve, which depends on the load on said frame, the actuation conditions of said high-speed-jounce blow-off valve means also being changed by the pressure applied to said pressure fitting by said leveling valve,
said piston having rebound metering valve means for sending fluid in metered amounts from said upper chamber into said lower chamber upon upward movement of said piston, high-speed-rebound blow-off valve means for sending additional fluid from said upper chamber to said lower chamber upon high-velocity upward movement of said piston, said rebound metering valve means including normally closed second one-way check valve means for preventing back flow from said lower chamber to said upper chamber, and passage means connecting the lower end of said rebound metering valve means and the lower end of said high-speed-rebound blow-off valve means to said upper pressure fitting, the pressure applied to said upper pressure fitting by the leveling valve depending on the frame-supported load and acting to change the flow rate of said rebound metering valve means and the actuation conditions of said high-speed-rebound valve means,
said upper end wall having normally closed third check valve means for enabling flow from said annular space into said upper chamber upon downward movement of said piston.

20. A vehicle suspension system with load-controlled damping, including in combination:
a vehicle having wheel supported axles and a frame,
a mechanical spring system between said frame and said axles,
load-controlled damper means between said axles and said frame, said damper including in combination:
a first cylinder assembly having a first cylinder with an upper closed end and a lower closed end, with an axial passage therein below and spaced from said cylinder with an outlet from said axial passage, said cylinder being substantially filled with hydraulic fluid, said lower closed end being secured to a said axle,
a first piston in said first cylinder and having large axially extending openings therethrough enabling relatively unimpeded movement thereof in said cylinder, said first piston having a first piston rod extending out through said upper closed end and secured to said frame,
a second piston in said first cylinder below said first piston and having a second piston rod extending through a seal in said lower closed end and into said axial passage, said axial passage and outlet being filled with hydraulic fluid, and
a mechanical spring between and bearing against said first and second pistons,
a second cylinder assembly having a second upper closed end and a second lower closed end and comprising an outer cylinder and an inner cylinder inside said outer cylinder with an annular space between them, said lower end being mounted to a said axle,
a third piston in said inner cylinder with a third piston rod extending through said second upper end and secured at its upper end to said frame and having an upper fitting connected to said outlet from said axial passage of said first cylinder,
said inner cylinder being filled with hydraulic fluid both above and below said third piston, said annular space being filled with the same fluid except for an air space at the top,
said second lower closed end having jounce metering valve means for passing said fluid in metered amount from below said third piston into said annular space upon downward movement of said third piston, high-speed-jounce blow-off valve means for passing said fluid in larger amount from below said third piston into said annular space upon high-velocity downward movement of said third piston, check valve means for passing said fluid from said annular space into said inner cylinder below said third piston under rebound conditions, and a lower fitting connected to said outlet from said axial passage of said first cylinder assembly, and transmitting pressure therefrom to said jounce metering valve means to vary its resistance to said passing of said fluid therethrough, and to said high-speed-jounce blow-off valve means to vary its actuation conditions, said third piston having rebound metering valve means for sending fluid in metered amounts from above said third piston to below said third piston upon upward movement of said third piston, said rebound metering valve means including check valve means for preventing reverse flow, high-speed-rebound blow-off valve means for sending additional fluid from above said third piston to below said third piston upon high-velocity upward movement of said third piston, and passage means transmitting pressure from said upper fitting to said rebound metering valve means for varying its resistance to said fluid passing through it and to said high-speed-rebound blow-off valve means to vary its actuating conditions, said second upper closed end having check valve means for enabling flow from said annular space into said inner cylinder above said third piston upon downward movement of said third piston.

21. The system of claim 18, 19, or 20 wherein said jounce metering valve means comprises a cylindrical chamber closed at its upper end, a sliding tapering needle in said chamber, wider at the bottom than at the top and having a seal near the bottom, a spring above said needle urging it normally downwardly, and a passage leading across said cylindrical chamber below said spring and having an inlet opening into the bottom of said inner cylinder and an outlet opening into said annular space.

22. The system of claim 18, 19, or 20 wherein said high-speed-jounce blow-off valve means comprises a poppet chamber extending down from the bottom of said cylinder, a tapered valve seat at the top of said chamber, a poppet valve, a spring normally holding said poppet valve against said seat, and a passage leading from a position below said seat into said annular space.

23. The system of claim 18, 19 or 20 wherein said rebound metering valve means comprises a cylindrical chamber closed at its upper end, a sliding tapering needle in said chamber, wider at the bottom than at the top and having a seal at the bottom, a spring above said needle urging it normally downwardly, and a passage leading across said cylindrical chamber below said spring and having an inlet at the upper end of said piston and an oulet through the lower end of said piston.

24. The system of claim 23 having one-way check valve means between said outlet and said cylindrical chamber preventing flow from said outlet to said inlet.

25. The system of claim 18, 19, or 20 wherein said high-speed-rebound blow-off valve means comprises a poppet chamber extending down from the upper end of said piston, a tapered valve seat at the top of said chamber, a poppet valve, a spring normally holding said poppet valve against said seat, and a passage leading from a position below said seat to the bottom of said piston.

26. The system of claim 18, 19, or 20 wherein the connections between said leveling valve and said upper and lower fitting includes air-oil interface means, so that there is oil in each said fitting.

27. The system of claim 18, 19 or 20 having pressure multiplier means between said leveling valve and each said fitting.

28. A vehicle suspension system with load-controlled damping, including in combination:

a vehicle having wheel supported axles and a frame,
air-spring means between said frame and said axles,
compressed air supply means on said frame for and connected to said air spring means,
a leveling valve on said frame actuated by changes in the distance between said axles and said frame and connected to said air-spring means and to said air supply means and having bleed means, for sending compressed air into and bleeding air from said air spring means, and
load-controlled damper means between said axles and said frame, said damper including in combination:
a cylinder assembly having an upper closed end and a lower closed end and comprising an outer cylinder and an inner cylinder inside said outer cylinder with an annular space between them, said lower end being mounted to a said axle,
a piston in said inner cylinder with a piston rod extending through said upper end and secured at its upper end to said frame and having an upper fitting connected to said leveling valve,
said inner cylinder being filled with hydraulic fluid both above and below said piston, said annular space being filled with the same fluid except for an air space at the top,
said lower closed end having by-pass check valve means for passing said fluid from said annular space into said inner cylinder below said piston under rebound conditions,
said piston having (1) jounce metering valve means for passing said fluid in metered amount from below said piston to above said piston upon downward movement of said piston, via a check valve preventing reverse flow, (2) high-speed-jounce blow-off valve means for passing said fluid in larger amount from below said piston to above said piston upon high-velocity downward movement of said piston, (3) rebound metering valve means for sending fluid in metered amounts from above said piston to below said piston upon upward movement of said piston, said rebound metering valve means including check valve means for preventing reverse flow, and (4) high-speed-rebound blow-off valve means for sending additional fluid from above said piston to below said piston upon high-velocity upward movement of said piston, and (5) passage means transmitting pressure from said upper fitting to said jounce metering valve means and said rebound metering valve means for varying its resistance to said fluid passing through them and to said high-speed-jounce blow-off valve means and to said high-speed-rebound blow-off valve means to vary their actuating conditions,
said upper closed end having check valve means for enabling flow from said annular space into said inner cylinder above said piston upon downward movement of said piston.

29. A vehicle suspension system with load-controlled damping, including in combination:
a vehicle having wheel-supported axles and a frame,
air-spring means between said frame and said axles,
compressed air supply means on said frame for and connected to said air spring means, a leveling valve on said frame actuated by changes in the distance between said axles and said frame and connected to said air-spring means and to said air supply means and having bleed means, for sending compressed air into and bleeding air from said air-spring means, and load-controlled damper means between said axles and said frame, said damper including in combination:

a cylinder assembly having an upper end and a lower end and comprising an outer cylinder, an inner cylinder inside said outer cylinder, and upper end closure, and a lower end closure, closing both said cylinders at both ends and spacing them apart to provide an annular space between them, said lower end closure having a lower mounting bracket mounted to a said axle, the upper end of the inner cylinder ending below the upper end of the outer cylinder to provide an enlarged upper portion of said annular space, a piston in said inner cylinder with a piston rod extending through said upper end closure and having an upper mounting bracket at its upper end secured to said frame and having a pressure fitting connected to said leveling valve, said piston dividing said inner cylinder into an upper chamber and a lower chamber, said inner cylinder being filled with hydraulic fluid both above and below said piston, said annular space being filled with the same fluid except for an air space in its enlarged upper portion, said lower end closure having first by-pass check valve means for passing said fluid from said annular space into said lower chamber under rebound conditions, said piston having (1) jounce metering valve means for passing said fluid in metered amount from said lower chamber into said annular space upon downward movement of said piston with second usually closed check valve means for preventing reverse flow, (2) high-speed-jounce blow-off valve means for passing said fluid in larger amount from said lower chamber into said annular space upon high-velocity downward movement of said piston, said jounce metering valve means being connected to said pressure fitting by passage means and including means for varying the fluid flow rate according to the pressure applied to said lower fitting by said leveling valve, which depends on the load on said frame, said high-speed-jounce blow-off valve means being connected to said pressure fitting by said passage means and having means for changing the actuation conditions thereof in acccordance with the pressure applied to said pressure fitting by said leveling valve, (3) rebound metering valve means for sending fluid in metered amounts from said upper chamber into said lower chamber upon upward movement of said piston, said rebound metering valve means including normally closed third one-way check valve means for preventing back flow from said lower chamber to said upper chamber and passage means connecting the lower end of said rebound metering valve means to said pressure fitting, (4) high-speed-rebound blow-off valve means for sending additional fluid from said upper chamber to said lower chamber upon high-velocity upward movement of said piston, passage means connecting the lower end of said high-speed-rebound blow-off valve means to said pressure fitting, the pressure applied to said pressure fitting by the leveling valve depending on the frame-supported load and acting to change the flow rate of said rebound metering valve means and the actuation conditions of said high-speed-rebound valve means.

30. A vehicle suspension system with load-controlled damping, including in combination:

a vehicle having wheel supported axles and a frame, a mechanical spring system between said frame and said axles, load-controlled damper means between said axles and said frame, said damper including in combination:

a first cylinder assembly having a first cylinder with an upper closed end and a lower closed end, with an axial passage therein below and spaced from said cylinder with an outlet from said axial passage, said cylinder being substantially filled with hydraulic fluid, said lower closed end being secured to a said axle, a first piston in said first cylinder and having large axially extending openings therethrough enabling relatively unimpeded movement thereof in said cylinder, said first piston having a first piston rod extending out through said upper closed end and secured to said frame, a second piston in said first cylinder below said first piston and having a second piston rod extending through a seal in said lower closed end and into said axial passage, said axial passage and outlet being filled with hydraulic fluid, and a mechanical spring between and bearing against said first and second pistons, a second cylinder assembly having a second upper closed end and a second lower closed end and comprising an outer cylinder and an inner cylinder inside said outer cylinder with an annular space between them, said lower end being mounted to a said axle, a third piston in said inner cylinder with a third piston rod extending through said second upper end and secured at its upper end to said frame and having an upper fitting connected to said outlet from said axial passage of said first cylinder, said inner cylinder being filled with hydraulic fluid both above and below said third piston, said annular space being filled with the same fluid except for an air space at the top, said second lower closed end having by-pass check valve means for passing said fluid from said annular space into said inner cylinder below said third piston under rebound conditions, said third piston having (a) jounce metering valve means for passing said fluid in metered amount from below said third piston to above said third piston upon downward movement of said third piston with check valve means to prevent reverse flow, (b) high-speed-jounce blow-off valve means for passing said fluid in larger amount from below said third piston to above said third piston upon high-velocity downward movement of said third piston, (c) rebound metering valve means for sending fluid in metered amounts from above said third piston to below said third piston upon upward movement of said third piston, said rebound metering valve means including check valve means for preventing reverse flow, (d) high-speed-rebound blow-off valve means for sending additional fluid from above said third piston to below said third piston upon high-velocity upward movement of said third piston, and (e) passage means transmitting pressure from said upper fitting to each of said metering valve means for varying their resistance to said fluid passing through them and to each of said blow-off valve means to vary thier actuating conditions, said second upper closed end having check valve means for enabling flow from said annular space into said inner cylinder above said third piston upon downward movement of said third piston, said upper end closure having normally closed fourth check valve means for enabling flow from said annular space into said upper chamber upon downward movement of said piston.

31. The system of claim 28, 29, or 30 wherein said jounce metering valve means comprises a cylindrical chamber extending in an axial direction through said piston closed at the lower end of said piston, a sliding tapering needle in said chamber, wider at the top than at the bottom and having a seal near the top, a spring below said needle urging it normally upwardly, and a passage leading across said cylindrical chamber above said spring and having an inlet opening through the bottom of said piston and an outlet opening through the top of said piston, with a check valve being in said passage adjacent said outlet opening.

32. The system of claim 28, 29, or 30 wherein said high-speed-jounce blow-off valve means comprises a poppet chamber extending axially up from the bottom of said piston, a tapered valve seat at the bottom of said chamber, a poppet valve in said chamber, a spring normally holding said poppet valve against said seat, and a passage leading from a position above said seat through the upper end of said piston.

33. The system of claim 28, 29, or 30 wherein said rebound metering valve means comprises an axially extending cylindrical chamber closed at its upper end, a sliding tapering needle in said chamber, wider at the bottom than at the top and having a seal at the bottom, a spring above said needle urging it normally downwardly, and a passage leading across said cylindrical chamber below said spring and having an inlet at the upper end of said piston and an outlet through the lower end of said piston.

34. The system of claim 33 having the check valve means between said outlet and said cylindrical chamber preventing flow from said outlet to said inlet.

35. The system of claim 28, 29, or 30 wherein said high-speed-rebound blow-off valve means comprises a poppet chamber extending axially down from the upper end of said piston, a tapered valve seat at the top of said chamber, a poppet valve in said poppet chamber, a spring normally holding said poppet valve against said seat, and a passage leading from a position below said seat to the bottom of said piston.

36. The system of claim 28, 29, or 30 wherein the connections between said leveling valve and said pressure fitting includes air-oil interface means, so that there is oil in said fitting.

37. The system of claim 28, 29, or 30 having pressure multiplier means between said leveling valve and each said fitting.

38. A load-controlled damper including in combination:

a cylinder assembly having an upper closed end and a lower closed end and comprising an outer cylinder and an inner cylinder inside said outer cylinder with an annular space between them, said lower end having a lower mounting bracket, a piston in said inner cylinder with a piston rod extending through said upper end and having an upper mounting bracket there, said inner cylinder being filled with hydraulic fluid both above and below said piston, said annular space being filled with the same fluid except for an air space at the top, jounce-responsive means in said assembly for removing said fluid in metered amount from below said piston and supplying said fluid in the same amount upon downward movement of said piston, high-speed-jounce-responsive blow-off means in said assembly for removing said fluid in larger amount from below said piston and supplying said fluid above said piston upon high-velocity downward movement of said piston, rebound-responsive metering means in said assembly for removing fluid in metered amounts from above said piston and supplying a like amount of said fluid below said piston upon upward movement of said piston, high-speed-rebound-responsive blow-off means for removing additional said fluid from above said piston and supplying additional said fluid below said piston upon high-velocity upward movement of said piston, and pressure transmitting means for applying pressure corresponding to load to each said metering valve means and each said blow-off valve means to change the respective flow rates of said metering valve means and the actuation conditions of said respective blow-off valve means.

39. A load-controlled damper including in combination:

a cylinder assembly having an upper closed end and a lower closed end and comprising an outer cylinder and an inner cylinder inside said outer cylinder with an annular space between them, said lower end having a lower mounting bracket, a piston in said inner cylinder with a piston rod extending through said upper end and having an upper mounting bracket there provided with an upper fitting, said inner cylinder being filled with hydraulic fluid both above and below said piston, said annular space being filled with the same fluid except for an air space at the top, said lower closed end having jounce metering valve means for passing said fluid in metered amount from below said piston into said annular space upon downward movement of said piston, high-speed-jounce blow-off valve means for passing said fluid in larger amount from below said piston into said annular space upon high-velocity downward movement of said piston, check valve means for passing said fluid from said annular space into said lower chamber under rebound conditions, and a lower fitting, said piston having rebound metering valve means for sending fluid in metered amounts from above said piston to below said piston upon upward movement of said piston, said rebound metering valve means including check valve means for preventing reverse flow, high-speed-rebound blow-off valve means for sending additional fluid from above said piston to below said piston upon high-velocity upward movement of said piston, and passage means transmitting pressure from said upper fitting to said rebound metering valve means and to said high-speed-rebound blow-off valve means, the pressure applied to said upper and lower fittings acting to change the respective flow rates of said metering valve means and the actuation conditions of said respective blow-off valve means, said upper closed end having check valve means for enabling flow from said annular space into said inner cylinder above said piston upon downward movement of said piston.

40. A load-controlled damper, including in combination:

a cylinder assembly having an upper end and a lower end and comprising an outer cylinder, and inner cylinder inside said outer cylinder, an upper end closure, and a lower end closure, closing both said cylinders at both ends and spacing them apart to provide an annular space between them, said lower end closure having a lower mounting bracket, the upper end of the inner cylinder ending below the upper end of the outer cylinder to provide an enlarged upper portion of said annular space, a piston in said inner cylinder with a piston rod extending through said upper end closure and having an upper mounting bracket at its upper end, said piston dividing said inner cylinder into an upper chamber and a lower chamber, said inner cylinder being filled with hydraulic fluid both above and below said piston, said annular space being filled with the same fluid except for an air space in its enlarged upper portion, said lower end closure having jounce metering valve means for passing said fluid in metered amount from said lower chamber into said annular space upon downward movement of said piston, high-speed-jounce blow-off valve means for passing said liquid in larger amount from said lower chamber into said annular space upon high-velocity downward movment of said piston, first one-way check valve means for passing said fluid from said annular space into said lower chamber under rebound conditions, a pressure fitting, and first passage means connecting the lower end of said jounce metering valve means and the lower end of said high-speed-jounce blow-off valve means to said pressure fitting, said jounce metering valve means including means for varying the fluid flow rate according to the pressure applied to said pressure fitting, the actuation conditions of said high-speed-jounce blow-off valve means also being changed by the pressure applied to said pressure fitting, said piston having rebound metering valve means for sending fluid in metered amounts from said upper chamber into said lower chamber upon upward movement of said piston, high-speed-rebound blow-off valve means for sending additional fluid from said upper chamber to said lower chamber upon high-velocity upward movement of said piston, said rebound metering valve means including normally closed second one-way check valve means for preventing back flow from said lower chamber to said upper chamber, said upper end wall having normally closed third check valve means for enabling flow from said annular space into said upper chamber upon downward movement of said piston.

41. The damper of claim 38, 39, or 40 wherein said jounce metering valve means comprises a cylindrical chamber closed at its upper end, a sliding tapering needle in said chamber, wider at the bottom than at the top and having a seal near the bottom, a spring above said needle urging it normally downwardly, and a passage leading across said cylindrical chamber below said spring and having an inlet opening into the bottom of said inner cylinder and an outlet opening into said annular space.

42. The damper of claim 38, 39, or 40 wherein said high-speed-jounce blow-off valve means comprises a poppet chamber extending down from the bottom of said cylinder, a tapered valve seat at the top of said chamber, a poppet valve, a spring normally holding said poppet valve against said seat, and a passage leading from a position below said seat into said annular space.

43. The system of claim 38, 39, or 40 wherein said rebound metering valve means comprises a cylindrical chamber, a sliding tapering needle in said chamber, wider at the bottom than at the top and having a seal at the bottom, a spring above said needle urging it normally downwardly, and a passage leading across said cylindrical chamber below said spring and having an inlet at the upper end of said piston and an outlet through the lower end of said piston.

44. The system of claim 43 having one-way check valve means between said outlet and said cylindrical chamber preventing flow from said outlet to said inlet.

45. The system of claim 38, 39, or 40 wherein said high-speed-rebound blow-off valve means comprises a poppet chamber extending down from the upper end of said piston, a tapered valve seat at the top of said chamber, a poppet valve, a spring normally holding said poppet valve against said seat, and a passage leading from a position below said seat to the bottom of said piston.

46. A load-controlled damper including in combination:

a cylinder assembly having an upper closed end and a lower closed end and comprising an outer cylinder and an inner cylinder inside said outer cylinder with an annular space between them, said lower end having a lower mounting bracket, a piston in said inner cylinder with a piston rod extending through said upper end and having an upper mounting bracket there provided with an inlet fitting, said inner cylinder being filled with hydraulic fluid both above and below said piston, said annular space being filled with the same fluid except for an air space at the top, said lower closed end having by-pass check valve means for passing said fluid from said annular space into said lower chamber under rebound conditions, said upper closed end having check valve means for enabling flow from said annular space into said inner cylinder above said piston upon downward movement of said piston, said piston having:

(1) jounce metering valve means for passing said fluid in metered amount from below said piston to above said piston upon downward movement of said piston, said jounce metering valve including check valve means for preventing reverse flow, (2) high-speed-jounce blow-off valve means for passing said fluid in larger amount from below said piston to above said piston upon high-velocity downward movement of said piston, (3) rebound metering valve means for sending fluid in metered amounts from above said piston to below said piston upon upward movement of said piston, said rebound metering valve means including check valve means for preventing reverse flow and (4) high-speed-rebound blow-off valve means for sending additional fluid from above said piston to below said piston upon high-velocity upward movement of said piston, and passage means transmitting pressure from said upper fitting to both said metering valve means and to both said blow-off valve means, the pressure applied to said inlet fitting acting to change the respective flow rates of said metering valve means and the actuation conditions of said respective blow-off valve means.

47. The damper of claim 46 wherein said jounce metering valve means comprises an axially extending cylindrical chamber closed at its lower end, a sliding tapering needle in said chamber, wider at the top than at the bottom and having a seal near the top, a spring below said needle urging it normally upwardly, and a passage leading across said cylindrical chamber above said spring and having an inlet opening through the bottom of said piston and an outlet opening through the top of said piston.

48. The damper of claim 46 wherein said high-speed-jounce blow-off valve means comprises a poppet chamber extending axially up from the bottom of said piston, a tapered valve seat at the bottom of said poppet chamber, a poppet valve in said poppet chamber, a spring normally holding said poppet valve against said seat, and a passage leading from a position above said seat through the upper end of said piston.

49. The system of claim 46 wherein said rebound metering valve means comprises an axially extending cylindrical chamber, a sliding tapering needle in said chamber, wider at the bottom that at the top and having a seal at the bottom, a spring above said needle urging it normally downwardly, and a passage leading across said cylindrical chamber below said spring and having an inlet at the upper end of said piston and an outlet through the lower end of said piston.

50. The system of claim 49 having one-way check valve means between said outlet and said cylindrical chamber preventing flow from said outlet to said inlet.

51. The system of claim 46 wherein said high-speed-rebound blow-off valve means comprises an axially extending poppet chamber extending down from the upper end of said piston, a tapered valve seat at the top of said poppet chamber, a poppet valve in said poppet chamber, a spring normally holding said poppet valve against said seat, and a passage leading from a position below said seat to the bottom of said piston.

* * * * *